Figure 4:
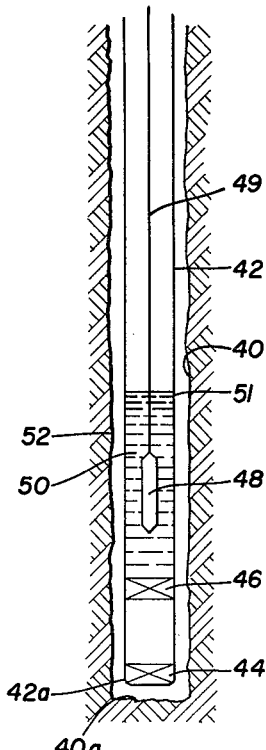

March 2, 1965 L. G. CARTER 3,171,480
USE OF CHEMICALLY-GENERATED HEAT IN A WELL CEMENTING METHOD
Filed Aug. 6, 1962 2 Sheets-Sheet 1
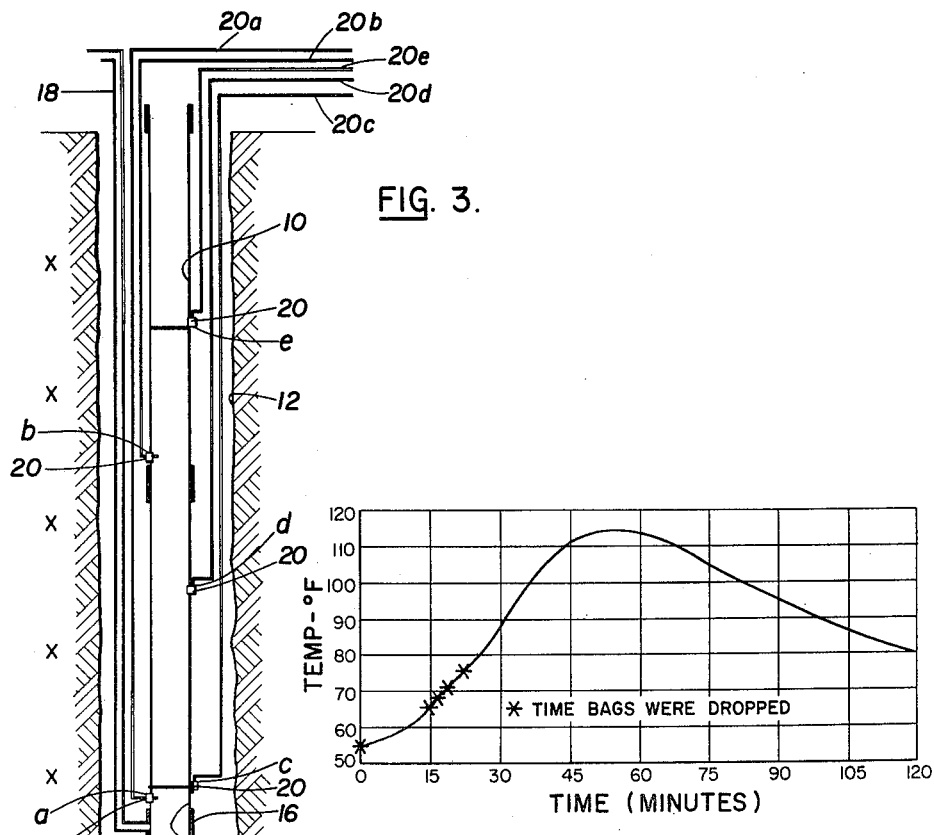
FIG. 3.
FIG. 1.
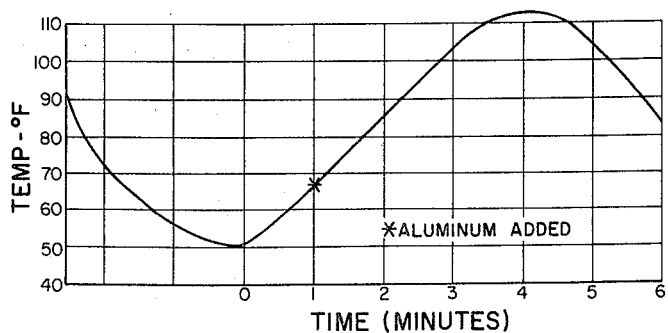
FIG. 2.
Lloyd G. Carter
INVENTOR.
BY Paul H. Leonard
ATTORNEY.

March 2, 1965 L. G. CARTER 3,171,480
USE OF CHEMICALLY-GENERATED HEAT IN A WELL CEMENTING METHOD
Filed Aug. 6, 1962 2 Sheets-Sheet 2

Lloyd G. Carter
INVENTOR.

BY Paul H. Leonard

ATTORNEY.

United States Patent Office
3,171,480
Patented Mar. 2, 1965

3,171,480
USE OF CHEMICALLY-GENERATED HEAT IN A WELL CEMENTING METHOD
Lloyd G. Carter, Duncan, Okla., assignor to Halliburton Company, Duncan, Okla., a corporation of Delaware
Filed Aug. 6, 1962, Ser. No. 215,091
5 Claims. (Cl. 166—25)

The present invention relates to a new and improved method of cementing wells and more particularly to a new and improved method of accelerating the set of a cement slurry in well cementing operations when temperatures are relatively low.

Cementing casing when well temperatures are below about 60° F. and/or surface formations are frozen presents a serious problem in well cementing operations. In performing such well cementing operations in cold weather, it is not unusual for a period of 3–7 days to be required in order for the cement to set sufficiently for drilling operations to be continued. Cement slurries containing a gypsum cement, calcium chloride as an accelerator or other chemical accelerators have been used in such circumstances with varying degrees of success. The chemicals and amounts used must be varied with the particular type of cement used as well as in accordance with temperatures and pressures.

In using chemical accelerators, however, considerable caution must be exercised in order to prevent a flash setting of the cement slurry. In addition to the use of chemicals, the cement is often preheated or warmed, the mixing water is heated, and in some instances the hole is warmed, all for the purpose of controlling setting time.

An ideal or optimum cement slurry is one which remains sufficiently fluid for a length of time to be pumped or introduced into a desired area or location in the well, and which will set or harden reasonably soon after placement so that a minimum of waiting-on-cement time occurs. Lengthy WOC times enhance the cost of drilling operations and are therefore undesirable.

This period of time in which the cement slurry remains sufficiently fluid to be pumpable under the particular well conditions of temperature and pressure is known as thickening time. The thickening time must, of course, be of such length that the desired amount of slurry is mixed and placed in the well. It is well known that temperature or heat hastens the hydration of the cement components and thus decreases the thickening time. It can therefore readily be seen that low well and surface temperatures will prolong the thickening time and if sufficiently low may prevent the cement from setting at all.

Temperatures ranging from 80° F.–120° F. have been found to be particularly ideal in arriving at desired thickening and WOC (waiting on cement) times with most cement slurries. These optimum temperatures do not prevail during winter months or in certain cold climates, and as ordinary cements will not generally set within a reasonable time at temperatures below 60° F., something must be done.

It is therefore a primary object of the present invention to provide a new and improved method of cementing in cold climates wherein the cement slurry is externally heated to provide a desired setting time and waiting-on-cement time.

It is an important object of the present invention to provide a new and improved method of accelerating the set of a cement slurry in well cementing operations which may be applied to all types of cementing jobs.

Another important object of the present invention is to provide a new and improved method of well cementing wherein heat is chemically generated and externally applied to a cement slurry for accelerating the set thereof.

Another object of the present invention is to provide a new and improved method of well cementing, wherein waiting-on-cement time is reduced by the chemical generation of heat inside the casing, thereby heating same and in turn heating the cement slurry in the well.

Still another object of the present invention is to provide a new and improved method of heating a cementing slurry in a well bore utilizing a material which would function as a non-plugging perforating fluid when fracturing or cleaning up the formation around the well bore.

Figure 5:
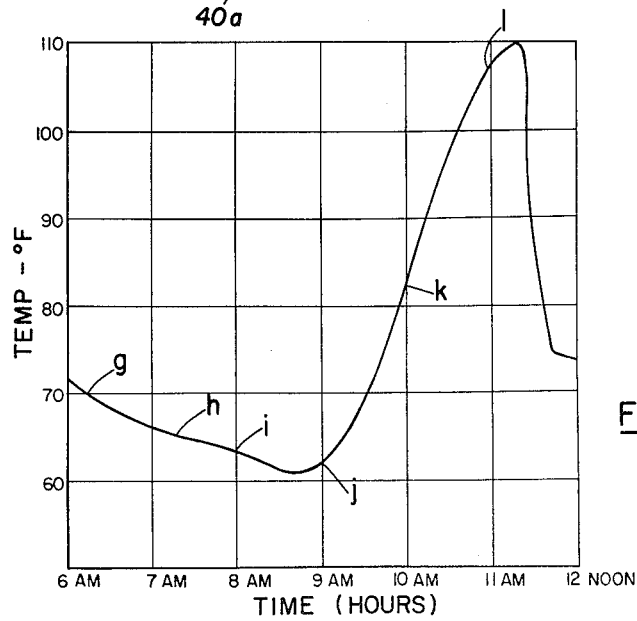

Other objects and advantages of the present invention will be readily apparent from the following description and drawings wherein:

FIG. 1 is a graph illustrating the results of Test 8;
FIG. 2 is a graph illustrating the results of Test 9;
FIG. 3 is a schematic drawing of the test equipment used in Tests 10–17;
FIG. 4 is a schematic drawing of test equipment used in Canadian field test; and
FIG. 5 is a graph illustrating the results of the above test.

In carrying out the method of this invention, a well cementing operation is performed in a manner well known in the art. After the cement is mixed and displaced to the desired area in the well bore, a solution or liquid is placed behind the top plug. This liquid is heated a predetermined amount by the reaction of certain chemicals and heats the casing in the well bore and consequently the cementing column and the formation. Although heat up to 1000° F. or more can be generated in this manner, it is preferred that the amount of heat generated be sufficient to raise the temperature around the cementing column to a temperature of from about 80° F.–120° F. Other desired temperatures may be achieved without departing from the scope of the invention.

There are a number of ways of chemically generating heat and heat producing chemicals which may be used in the present invention. The heat generating operation should be one which has no deleterious effects on the well casing.

Some of these methods are the addition of magnesium pellets, bars or powders to an aqueous acid solution; the addition of metallic sodium to salt water; the addition of sodium hydroxide to water; and the mixture of sodium hydroxide, sodium nitrate, aluminum and water.

From the standpoint of economics, amount of heat generated, relative safety in handling and of having the least corrosive properties, the latter method is particularly preferred.

In addition to the heat generating solution or methods set forth above, it can be appreciated that there are many others which can be used without departing from the scope of the invention.

A preferred procedure when using the sodium hydroxide, sodium nitrate, aluminum and water mixture of above is as follows:

First, mix the caustic soda in water and then add the sodium nitrate to the caustic water solution. This mixture is used to displace the top cement plug in the well. If it is desired to heat only the lower portion of the cement, then the caustic mixture may be followed by either clear water or drilling mud. After the caustic mixture has been placed across the section to be heated, aluminum is added to the caustic mixture. This may be accomplished by either pouring or dropping the aluminum down the well bore or aluminum bombs can be made by rolling powder or pellets in aluminum foil or by placing it in screen wire rolled into a cylinder. This cylinder may then be either lowered into the well on a wire line or dropped directly into the casing. It is recommended that the casing be left open throughout the test, because of the gas that is liberated during the chemical reaction of the various materials.

It is also recommended that for formations below 50° F., the following ratio of materials by weight per gallon of water be used: (1:1:0.1) caustic:sodium nitrate:aluminum, respectively. (See Table II.) The ratio of the above materials by weight per gallon of water of 0.5:0.5:0.1 is recommended above 50° F., if it is desired to further accelerate the setting of the cement (see Table II-A).

A number of laboratory and field tests have been made which show that by chemically heating the water in the casing and allowing the heat to dissipate through the casing to the cement and formation, the set of the cement is accelerated.

Initial tests employed granulated sodium hydroxide. Flake caustic soda was used in some tests, with no variation in results being noted.

Various grades and types of aluminum metal were tested to determine amount, type and size needed for optimum properties. The type that was found to be most satisfactory, was Reynolds Aluminum MG10-50. This material contained approximately 4 percent carbon with a particle size gradation of 78 percent passing 20 mesh sieve and 78 percent being retained on the 70 mesh sieve.

A powder form of sodium nitrate was found to be most suitable for these tests and was very soluble.

The most satisfactory method found for blending these materials was by first mixing the necessary amounts of caustic soda in the water by using a jet mixer and then recirculating the caustic mixture through the jet mixer and adding the sodium nitrate. The sodium nitrate and the caustic soda may be added at the same time through the jet mixer if desired. This solution is then used to displace the top plug. Aluminum is added at the well head and allowed to fall to the bottom. This may be accomplished by pouring it directly into the casing or a bomb may be made by using either screen wire or aluminum foil and dropping it to the bottom. Another suitable method is to lower the aluminum bomb on a wire line and when the reaction becomes too violent, pull the aluminum bomb out of the caustic mixture. This is repeated as often as necessary to maintain the desired amount of heat.

The reaction of sodium hydroxide with aluminum liberates hydrogen ($H_2$) gas; however, when sodium nitrate is mixed with the caustic solution, the hydrogen gas that is released will chemically react with the sodium nitrate, forming ammonia gas ($NH_4$). Table I below gives the various chemical reactions that take place when using these various materials in water.

TABLE I

Chemical reactions (1) $2Al + 2NaOH + 3H_2O \rightarrow NaH_2AlO_3 + NaAlO_2 + 3H_2\uparrow$ (2) $2NaNO_3 + 8H_2 \rightarrow 2NH_3\uparrow + 2NaOH + 4H_2O$ Initial tests consisted of calculating the number of B.t.u.'s per pound of material that would be liberated by the chemical reaction of various materials in water.

The optimum amount of chemicals needed to generate enough heat to increase the setting time of the cement based on pounds of chemical per gallon of water is a ratio of (1:1:0.1) of caustic soda:sodium nitrate:aluminum, respectively. However, a mixture of (0.5:0.5:0.1) can be used, although the amount of heat generated and the time of duration of reaction is not as high or long as the other.

Various examples are illustrated in Tables II and II-A which show the amounts of materials needed to increase the setting time of cement slurries for various depths and pipe sizes on surface jobs.

TABLE II

Calculated amount of materials needed to heat cement

[Formation temperature below 50° F. Ratio of caustic: sodium nitrate:aluminum:water, 1 lb. :1 lb. :0.1 lb. :1 gal.]

(10¾ INCH CASING, 45.5 POUNDS PER LINEAR FOOT)

| Materials (Pounds) | Length of Casing (Feet) | | | |
| --- | --- | --- | --- | --- |
| | 1 | 100 | 500 | 1,000 |
| Caustic Soda | 4 | 400 | 2,000 | 4,000 |
| Sodium Nitrate | 4 | 400 | 2,000 | 4,000 |
| Aluminum | .4 | 40 | 200 | 400 |
| Water, gals | 4.04 | 404 | 2,020 | 4,040 |

(13⅜ INCH CASING, 61.0 POUNDS PER LINEAR FOOT)

| Materials (Pounds) | Length of Casing (Feet) | | | |
| --- | --- | --- | --- | --- |
| Caustic Soda | 6.4 | 640 | 3,200 | 6,400 |
| Sodium Nitrate | 6.4 | 640 | 3,200 | 6,400 |
| Aluminum | 0.6 | 64 | 320 | 640 |
| Water, gals | 6.4 | 639 | 3,195 | 6,390 |

(16 INCH CASING, 65.0 POUNDS PER LINEAR FOOT)

| Materials (Pounds) | Length of Casing (Feet) | | | |
| --- | --- | --- | --- | --- |
| Caustic Soda | 9.5 | 950 | 4,750 | 9,500 |
| Sodium Nitrate | 9.5 | 950 | 4,750 | 9,500 |
| Aluminum | 1.0 | 95 | 475 | 950 |
| Water, gals | 9.5 | 949 | 4,744 | 9,488 |

TABLE II-A

Calculated amount of materials needed to heat cement

[Formation temperature above 50° F. Ratio of caustic: sodium nitrate:aluminum:water, 0.5 lb. :0.5 lb. :0.1 lb. :1 gal.]

(10¾) INCH CASING, 45.5 POUNDS PER LINEAR FOOT)

| Materials (Pounds) | Length of Casing (Feet) | | | |
| --- | --- | --- | --- | --- |
| | 1 | 100 | 500 | 1,000 |
| Caustic Soda | 2 | 200 | 1,000 | 2,000 |
| Sodium Nitrate | 2 | 200 | 1,000 | 2,000 |
| Aluminum | .4 | 40 | 200 | 400 |
| Water, gals | 4.04 | 404 | 2,020 | 4,040 |

(13⅜ INCH CASING, 61.0 POUNDS PER LINEAR FOOT)

| Materials (Pounds) | Length of Casing (Feet) | | | |
| --- | --- | --- | --- | --- |
| Caustic Soda | 3.2 | 320 | 1,600 | 3,200 |
| Sodium Nitrate | 3.2 | 320 | 1,600 | 3,200 |
| Aluminum | 0.6 | 32 | 320 | 640 |
| Water, gals | 6.39 | 639 | 3,195 | 6,390 |

(16 INCH CASING, 65.5 POUNDS PER LINEAR FOOT)

| Materials (Pounds) | Length of Casing (Feet) | | | |
| --- | --- | --- | --- | --- |
| Caustic Soda | 4.75 | 475 | 2,375 | 4,750 |
| Sodium Nitrate | 4.75 | 475 | 2,375 | 4,750 |
| Aluminum | 1.0 | 47 | 475 | 950 |
| Water, gals | 9.49 | 949 | 4,744 | 9,488 |

Tests were then conducted on the materials that appeared to be most suitable by placing a given amount of the material in a metal beaker and measuring the rise in temperature by the exothermic reaction of the material in water:

*Test 1.*—This test was conducted in the lab with 794 cc. of water being placed in a metal beaker and by adding 131.66 grams of granulated NaOH (pellets). This amount of NaOH was calculated to increase the temperature of the water by 80° F. The initial temperature of the water was 80° F. and after the addition of NaOH, the temperature rose to 154° F. The temperature of 154° F. was maintained by the addition of 6.5 grams of NaOH every 5 minutes for a total time of 30 minutes. The temperature of the water after 1 hour and 30 minutes was 111° F.

*Test 2.*—This test consisted of placing 794 cc. of water in a metal beaker and adding 131.66 grams of pellet NaOH to the water for an 80° F. change in temperature. The metal beaker was placed in a cold temperature water bath that was maintained at a temperature of 40° F. The water in the metal beaker at start of test was 40° F. and after the addition of NaOH the temperature rose to 80° F. Additional amounts of NaOH were added to the water throughout the test, with the time and amount being given in the table below. The water bath was circulated throughout the test period.

| Time (Minutes) | Amount of NaOH (grams) | Temperature (° F.) |
|---|---|---|
| 0 | | 40 |
| 0 | 131.66 | 40 |
| 1 | | 80 |
| 4 | 6.6 | 74 |
| 8 | 13.2 | 65 |
| 11 | 26.4 | 63 |
| 14 | 26.4 | 61 |
| 17 | 65.8 | 61 |
| 28 | 65.8 | 60 |
| 60 | | 46 |

*Test 3.*—This test was similar to Test Number 2, except the water in the bath was not circulated. Temperature of water in metal beaker and the bath at start of test was 40° F. This test consisted of adding the same amount of flake caustic to the same amount of water as Test Number 2, but the NaOH was added in two equal groups (131.66 grams at a time). The first batch increased the temperature to 116° F.; the second batch was added 2 minutes after the first and the temperature was further increased to 135° F. The water was then allowed to cool in the temperature bath and it took 70 minutes for the temperature to reach 44° F.; however, the caustic was stirred up in the water and the temperature increased to 55° F.

*Test 4.*—In this test a piece of 2-inch line pipe having an O.D. of 2⅜ inches was placed in each of two pieces of 4-inch line pipe having an I.D. of 4 inches. The annular space between the 2-inch pipe and the 4-inch pipe of each sample was filled with API Class A cement and thereafter each sample was placed in a water bath at a temperature of 56° F. The inside of the 2-inch pipe was filled with water and caustic was added to one of the samples to increase the temperature to 80° F. and then cured under these conditions for 24 hours. The bond between the cement and 2-inch pipe was broken with the following results being noted: the shear strength of the specimen that was not heated was 37 pounds per square inch of bonded surface, while the sample that was chemically heated had a bonding strength of 64 pounds per square inch of bonded surface. The length of each test specimen was 11 inches.

*Test 5.*—This test was made to evaluate the usefulness of blending aluminum to the flake caustic. The ratio of NaOH to aluminum was 10 parts to 1 part with 131.66 grams of the blend being added to 794 cc. of water, which was placed in a metal beaker and set in a water bath at a temperature of 54° F. The temperature of the water in the beaker at the start of the test was 54° F. and the maximum temperature recorded was 140° F. After 60 minutes, the temperature of the water in the beaker was 56° F.

*Test 6.*—This test was similar to Test Number 5, except the ratio of flake caustic to aluminum powder was 8 parts NaOH to 1 part aluminum. The temperature of the water at the start of the test was 60° F. and the maximum temperature reached was 180° F. The temperature of the test was 63° F. after 30 minutes, which was the end of the test.

Further tests were conducted on a slightly larger scale to verify results using a 2-foot section of 10¾ inch casing (55.5 pounds per foot).

*Test 7.*—This test was conducted outside the lab using a 2-foot section of 10¾ inch casing weighing 55.5 pounds per linear foot. The casing was filled with 7 gallons of water and flake NaOH and aluminum powder was added to the water for a 40° F. change in temperature. The ratio of NaOH to aluminum was 7 parts to 1 part respectively, and the total amount of material added to the water was 5 pounds. The blend was placed in 6 water soluble bags and sealed; however, when they were dropped in the water, the bags would not dissolve readily and the gas that was liberated caused the bags to float to the surface. The reaction became very violent, however the temperature of the water was increased to 120° F. and remained at that temperature for 1 hour and 15 minutes. After 2 hours had elapsed, it was 96° F. and after three hours, it was 92° F. The 10¾ inch casing was above ground.

*Test 8.*—This test was similar to Test Number 7, except 6 gallons of water were placed inside of the casing with the same ratio of flake NaOH and aluminum powder being used. The same desired change in temperature was observed. The only difference was the time at which the mixture was added to the water. See FIG. 1 for graph illustrating changes in temperature as bags were dropped.

*Test 9.*—The equipment used in this test was the same as used in Test Numbers 7 and 8. A mixture of caustic (flake) and water was made using 6 gallons of water containing ½ pound of caustic per gallon of water. This increased the temperature of the water to 92° F. The mixture was poured into the 10¾ inch casing and allowed to set overnight to cool. The type of aluminum used in the test was granulated 8–20 mesh. See FIG. 2 for graph illustrating the results of this test.

To further evaluate the feasibility of the experiment, tests were run in a well under actual conditions using an air drilled hole.

Referring now to FIG. 3, these tests consisted of placing two joints of seven inch casing 10 in a nine and five-eighths inch hole 12, with the total depth of the seven inch casing 10 being at fifty-five and one-half feet indicated at $y$. X indicates increments of ten feet. A swage nipple 14 was connected to the lower end 10a of the casing 10 by means of a drill collar 16. A one inch pipe 18 was used for circulating fluid through the casing when desired.

Thermocouples 20 were placed at appropriate locations on the inside and outside of the casing 10 for measuring the temperature. Thermocouples 20 were located inside of casing 10 at position $a$ about six inches up from the bottom, and at $b$ thirty feet up from the bottom. Thermocouples 20 were placed on outside of casing 10 at $c$ six inches up, at $d$ twenty feet up and at $e$ forty feet up. Suitable wires 20a, 20b, 20c, 20d and 20e connected the thermocouples 20 with a temperature recording instrument (not shown). The results of these tests are as follows:

*Test 10.*—An air drilled hole was used to conduct this test with 55.5 feet of 7 inch casing being placed in the 9⅝ inch hole. The casing had 5 thermocouples mounted on it with three on the outside and two on the inside of the casing to record temperature changes. The mixture used in this test was ½ pound of caustic (flake) and 0.1 pound of aluminum (powder) per gallon of water. Five barrels of water with 100 pounds of caustic was mixed through a jet mixer and circulated for 10 minutes. The casing was then filled with the mixture and allowed to set overnight. The next morning, a bomb consisting of 10 pounds of aluminum powder wrapped in aluminum foil, was dropped in the caustic solution. The caustic solution was approximately 20 feet from top of casing at start of test. The temperatures of caustic at the start of the test were as follows:

| Time | Position of Thermocouples, °F. | | | | |
|---|---|---|---|---|---|
| | Inside Bottom | Outside Bottom | Outside 20 Ft. up | Inside Middle | Outside 40 Ft. up |
| | a | c | d | b | e |
| Initial | 65 | 85 | 65 | 65 | 70 |
| Start | 65 | 68 | 68 | 65 | 60 |
| Maximum (30-Min.) | 160 | 155 | 135 | 135 | 120 |
| 5 hours | 120 | 117 | 115 | 105 | 100 |

*Test 11.*—Equipment used in this test was the same as Test Number 10 with ½ pounds of caustic (flake) per gallon of water being mixed with a small jet mixer and circulated for 10 minutes before being placed in 7 inch casing. To this mixture was added aluminum pellets (8–12 mesh) using 0.1 pound per gallon of water with two 5-pound bombs being made with aluminum foil. After start of test, it was necessary to add another 5-pound bomb of aluminum (0.5 lb. aluminum per gallon of water). Results of test are given below:

| Time | Position of Thermocouples, °F. | | | | |
|---|---|---|---|---|---|
| | Inside Bottom | Outside Bottom | Outside 20 Ft. up | Inside Middle | Outside 40 Ft. up |
| | a | c | d | b | e |
| Start | 100 | 100 | 100 | 100 | 100 |
| 1:30 | 120 | 118 | 110 | 110 | 109 |
| 1:40 | 275 | 148 | N.D. | | |
| 3:00 | 233 | 140 | 138 | 110 | 110 |

After the addition of the third bomb of aluminum, the reaction was very violent and the casing was unloaded.

*Test 12.*—This test was similar to Test 11 with ¼ pound of flake caustic being added to a gallon of water with 100 pounds of caustic being mixed with 10 barrels of water using a small jet mixer. After circulating for 10 minutes, the mixture was placed inside the 7 inch casing and 0.2 pound of aluminum pellets (8–12 mesh) were poured into the casing. Results of test are given below:

| Time | Position of Thermocouples, °F. | | | | |
|---|---|---|---|---|---|
| | Inside Bottom | Outside Bottom | Outside 20 Ft. up | Inside Middle | Outside 40 Ft. up |
| | a | c | d | b | e |
| Start | 73 | 75 | 75 | 75 | 73 |
| Max. (1:30) | 92 | 92 | 90 | 90 | 87 |
| 4:00 | 90 | 90 | 90 | 90 | 87 |

*Test 13.*—This test consisted of mixing 100 pounds of caustic with 5 barrels of water using a jet mixer and circulating the mixture for 10 minutes before placing in the casing. A 10-pound mixture of aluminum pellets (8–12 mesh) and aluminum powder (ratio 10#–3#) was blended and two 6.5 pound bombs of aluminum were added to the caustic. The reaction became very violent and the caustic was unloaded from the 7-inch casing. No temperatures were recorded.

*Test 14.*—This test consisted of using the same proportion of aluminum, water and caustic as in Test 13. The caustic solution was circulated for 10 minutes prior to placing inside of the 7-inch casing. Three 5-pound bombs of aluminum pellets (8–12 mesh) and aluminum powder (4–1 mixture) were made with aluminum foil. After the three bombs had been dropped in the casing, a large Lucite cylinder was placed inside the casing containing smaller cylinders filled with cement slurry. The large cylinder was lowered to a depth of only 30 feet because Lucite would melt if lowered to bottom. The maximum temperature at the depth of the cement samples was 90° F., although the temperature at the bottom was 195° F. and the cement had set after four hours. The temperature at the start of the test was 76° F. The concentration of aluminum was 0.15 pound per gallon of water.

*Test 15.*—This run was similar to Number 14; however, the cylinders were steel instead of Lucite with the cement slurry being lowered to within 5 feet of the bottom. The temperature at start of the test was 90° F. and maximum temperatures reached were 190° F. on bottom and 105° F. in the middle. The cement had set up after 5 hours, but due to the gas being given off, the samples were not very good. Flake caustic (0.5 pound) and 8–12 mesh aluminum pellets (0.2 pound) were used in this test.

*Test 16.*—Two hundred pounds of flake caustic were mixed with 5 barrels of water using a jet mixer and circulated for 10 minutes. The mixture was placed in the 7-inch casing with 18 pounds of aluminum pellets (8–12 mesh) being poured in the casing. Twenty pounds of sodium nitrate were mixed with the caustic and water solution prior to putting in the casing to change the hydrogen gas that is liberated to ammonia gas. The ratio of materials used in this test was 0.5:0.1:0.18 pounds of flake caustic, sodium nitrate and aluminum pellets (8–12 mesh) per gallon of water. Results of the test are below:

| Time | Position of Thermocouples, °F. | | | | |
|---|---|---|---|---|---|
| | Inside Bottom | Outside Bottom | Outside 20 Ft. up | Inside Middle | Outside 40 Ft. up |
| | a | c | d | b | e |
| Initial | 92 | 92 | 92 | 92 | 92 |
| Caustic added | 118 | 113 | 113 | 118 | 110 |
| 1:00 | 133 | 130 | 135 | 135 | 130 |
| 2:00 | 160 | 149 | 136 | 136 | 133 |
| 3:00 | 214 | 165 | 140 | 140 | 135 |
| 4:00 | 170 | 154 | 140 | 140 | 135 |
| 5:00 | 160 | 149 | 140 | 140 | 135 |
| Maximum | 214 | 165 | 142 | 141 | 136 |

*Test 17.*—This test consisted of mixing 200 pounds of flake caustic to 5 barrels of water with a jet mixer and then mixing 30 pounds of sodium nitrate to 3 barrels of the caustic solution and circulating for 10 minutes. Ten pounds of Reynolds Aluminum R–200x was placed in a screen wire, which was rolled into a cylinder 10 feet long having an I.D. of between 1 and 2 inches. The aluminum was first placed inside the 7-inch casing and lowered to the bottom. The mixture of caustic, water, and sodium nitrate was then put into the 7-inch casing. When the mixture was put across the aluminum, the reaction became violent and part of the mixture was unloaded from the casing. The ratio of materials per gallon of water were (1.0:0.25:0.1) of caustic, sodium nitrate and aluminum, respectively. The maximum temperatures recorded at the various points were 129° F. at inside bottom (*a*); 128° F. at outside bottom (*c*); 220° F. at inside middle (*b*); 150° F. at 20 feet up (*d*); and 120° F. at 40 feet up (*e*).

Additional tests consisted of cementing 7-inch casing in a 9-inch hole using 3-foot sections, with 2 feet of each section being cased while one foot extended above ground. Six sections were used altogether with three of them being heated chemically and then pulling the casing out of the cement after a given period of time.

*Test 18.*—This test consisted of setting six pieces of 7-inch casing (3-foot lengths) inside of six 9-inch holes and mixing Ideal Portland cement using a water-cement ratio of 5.2 gallons per sack. The annulus between the casing and hole was filled with cement and the inside of the casing was filled with plain water on three samples and with a caustic solution in the three others. The caustic (flake) was mixed in the water using ½ pound per gallon of water with the aluminum being added at different intervals. The type of aluminum used in this test was Reynolds Aluminum MG10-50 milled granules with 0.1 pound per gallon of caustic water being used. The aluminum was added to each sample in four equal amounts until all of the aluminum was used, which resulted in 0.1 pound per gallon of water.

Time            Remarks

9:30—Cement poured in annular space between pipe and hole.
10:30—Aluminum added to caustic water.
10:45—Temperature of caustic samples (water, 94° F. and cement, 88° F.). Temperature of tap water samples (water, 50° F. and cement, 50° F.).
12:30—Temperature of caustic samples (water, 80° F. and cement, 74° F.). Temperature of tap water samples (water, 50° F. and cement, 50° F.). Aluminum added to caustic samples (temperature increased to 200° F.).
1:30—First set of test samples were tested by applying an upward force on the casing to determine the amount of force needed to pull the casing out of the cement. A winch using three pulleys with a 4 to 1 mechanical advantage, was used to pull casing with the caustic sample taking 98 pounds and the other sample taking 44 pounds to break the bond between the cement and casing.
2:15—Additional aluminum was added to the two remaining caustic samples. The temperature of caustic samples (water, 79° F.; cement, 72° F.); temperature of tap water samples (water, 74° F.; cement, 52° F.).
3:30—Second set of samples broken with the caustic taking 86 pounds and tap water sample taking 58 pounds to break bond between cement and casing.
4:45—Third set of samples broken with the caustic sample taking 114 pounds and tap water sample taking 92 pounds to break bond between casing and cement.

| Sample No. | Time, hours | Pounds of Force To Break Pipe from Cement | |
|---|---|---|---|
| | | Caustic Sample | Tap Water Sample |
| 1 | 4:00 | 392 | 176 |
| 2 | 6:00 | 344 | 232 |
| 3 | 7:00 | 456 | 368 |

An actual field test was run as follows:
The test equipment is schematically illustrated in FIG. 4, wherein a twelve and one-fourth inch bore hole is indicated at 40 with an eight and five-eighths inch casing 42 positioned therein. A guide shoe 44 is positioned on the lower end 42a of the casing 42 at a depth of 498 feet KB. A float collar 46 is illustrated positioned in the casing 42 at 467 feet KB.

A McDonald-Keltner temperature tool 48 was suspended from a wireline 49 inside the casing 42 at a depth of 417 feet KB. The heating solution 50 extended in the casing 42 from the top plug to 51 at 355 feet KB.

After the regular cementing job was run, 300 pounds of flake caustic and 300 pounds of sodium nitrate were jet mixed in 300 gallons of water. This solution 50 was then placed behind the top plug after the cement was mixed and displaced to bottom on a surface cement job.

The original procedure was to evaluate the temperature increase in the chemical column by the use of a McDonald-Keltner temperature tool after the addition of each aluminum bomb. However, due to lost circulation problems and the necessity to recement, the test was shortened so as not to interfere with rig operations. The lost circulation zone extended from a point 52 to the bottom 40a of the hole 40.

A temperature survey was carried out immediately after plug had been bumped. Five pounds of aluminum powder was dropped and the temperature survey repeated. This step was repeated and at this time, in order not to delay recementing operations, the remaining 17 pounds of aluminum (1–5# bomb and 2–6# bombs) were dropped. Following this, three additional temperature surveys were taken over a period of four hours.

Tables III, IV, and V set forth the tabulation of the well data and determined temperatures:

TABLE III

Well location: Calgary, Alberta, Canada
Hole size: 12¼"
Hole depth: 498'
Casing size: 8⅝"
Casing depth: 498'
Float collar: 467'
Cement: 300 Inland Construction 2% $CaCl_2$ (sacks) and .17 lb./sack flocele.

An additional eight stages consisting of a total of 600 sacks were finally used before well was cemented to surface.

TABLE IV

*Surface temperatures*

|  | ° F. |
|---|---|
| (a) Mud returns | 43 |
| (b) Mixing water | 42 |
| (c) Cement slurry | 40 |
| (d) Heat generating solution | 72 |
| (e) Atmospheric temperature | 28 |

TABLE V

*Down hole temperatures taken at 417' KB approximate center of heating solution column*

| Time | Temperature, ° F. | Remarks |
|---|---|---|
| 6:15 | 72 | Surface temp. of solution. |
| 6:30 | | Plug down. |
| 7:00 | 66 | |
| 7:20 | | Drop 1st 5# Bomb. |
| 7:40 | 64 | |
| 7:47 | | Drop 2nd 5# Bomb. |
| 8:06 | 63 | |
| 8:10 | | Drop 1–5# Bomb and 2–6# Bombs. |
| 8:30 | 61 | |
| 9:30 | | Recement down annulus with 75 sacks. |
| 10:45 | 105 | |
| 11:15 | 110 | |
| 11:30 | | Recement down annulus with 125 sacks. |
| 11:42 | 74 | |
| 12:10 | 74 | |

Test discontinued due to apparent loss of heat to cement slurry which was lost to formation in the approximate vicinity covered by heat generating solution.

Because of lost circulation problems as indicated previously, the test was not as complete as originally planned. However, it did show that the materials used were able, under field conditions, to increase the temperature of the fluid in the pipe about 50° F. above normal. This temperature increase, should conditions have been such that no cement was lost in this vicinity, would have resulted in an 8-hour compressive strength of 1500+ p.s.i., whereas at unaltered temperatures, an 8-hour compressive strength of 145 p.s.i. would have been the case.

The down hole reaction during this test became somewhat violent and 2–3 barrels of water were unloaded from the pipe. Most of the activity occurred about 20 minutes after the three bombs were dropped and continued for 20 minutes. Slight bubbling occurred almost immediately following the addition of the first bomb.

FIGURE 5 illustrates the results of the above field test showing the temperature at various times during the cementing operation. Times and temperatures of particular phases of the operation are as follows:

g plug down
h dropped one 5# bomb
i dropped one 5#bomb
j dropped one 5# bomb and two 6# bombs
k Recemented down annulus
l Recemented down annulus As noted in FIG. 5, a very sharp decline in temperature resulted during the second recement job. It is believed that the lost circulation zone was taking the cold cement in the vicinity of the heating chemicals which would result in this sharp drop of the temperature.

When caustic or sodium hydroxide is used as one of the materials or heat producing reactants, it should be used in a sufficiently small quantity that the solution which it is in will not freeze after being placed in the well bore. Low well temperatures may cause sodium hydroxide solutions to freeze if the sodium hydroxide concentration is too high.

In using the caustic or sodium hydroxide-sodium nitrate-aluminum-water heat producing mixture system, it is preferred that the ratio by weight of the caustic to the aluminum be in the range of about 5:1 to about 50:1. The ratio by weight of the sodium nitrate to the caustic should be in the range of about 0.8:1 to about 2:1 for best results.

Magnesium pellets (20–40 mesh) and hydrochloric acid may also be used as the heat generating solution. When acid reacts upon magnesium, a large quantity of heat is liberated in a very short time (8400 B.t.u./lb. of reacted magnesium).

There should be no casing damage from the use of the acid. The magnesium chloride formed by the action of hydrochloric acid on magnesium is not harmful to the casing, nor will precipitation of magnesium hydroxide take place until the pH reaches 9. This will not occur in spent acid.

The quantity of magnesium and acid to use will have to be determined by the particular set of circumstances involved. The desired amount of heat should be the governing factor on the quantity of magnesium.

Some data on the magnesium-hydrochloric acid system is set forth in Table VI below:

TABLE VI

*Data on Mg-HCl system*

| | |
|---|---|
| Bulk density of magnesium | 8.5 lbs./gal. or 63.4 lbs./ft.$^3$. |
| Absolute density of magnesium | 1.74 |
| Heat produced per lb. of magnesium | 8400 B.t.u. |
| Volume of hydrogen produced per lb. of magnesium reached at standard temperature and pressure | 14.7 ft.$^3$ |
| Quantity of HCl necessary to dissolve 1 lb. of magnesium | 3 lbs. HCl gas or 2.24 gals. 15% HCl. |
| Theoretical temperature rise when 1 lb. of magnesium is reacted with 2.24 gals. of 15% HCl | 520° F. |

By heating the inside of casing, it is possible to greatly improve the early strength of cement. For example, the compressive strength of API Class A Cement when cured for 6 hours at 120° F. is 905 p.s.i., while the same cement cured at 60° F. for the same length of time will not be set. After six hours at 120° F. a 50–50 Pozmix A Cement without bentonite has a compressive strength of 455 p.s.i., while the same cement will not be set at 60° F. or 80° F. in the same time period.

The hydraulic cement mixes with which this invention may be employed to advantage include those in which any hydraulic cement of the character of Portland cement is the principal cementitious composition, pozzolanic cements or other cements used in well cementing operations. Any of the common aggregates and fillers may be employed in various proportions to meet different structural requirements. These include stone, gravel, slag, sand, pozzolanic materials, fly-ash, and the like, and such specialized materials as metallic aggregates, aluminum powder, etc. The invention is also applicable to neat cement mixes containing no aggregate or filler. All such mixes are comprehended by the term "hydraulic cement mix."

As indicated above, the invention does not preclude the use of other additives, as well as aggregates and fillers, for modifying various characteristics of the mixes for special purposes. For example, air entraining agents, cement dispersing agents, retarders, friction reducers, low fluid loss additives, accelerators, pigments, water-repellent compounds and other additives which may be employed in well cementing operations may also be used without departing from the scope of the invention.

Broadly, the present invention relates to a new and improved method of cementing wells at relatively low temperatures, wherein the cement slurry is pumped or placed in the desired location in the well, and thereafter the well casing or pipe is heated by the reaction of certain chemicals displaced therein and thus the cementing column and formation.

The foregoing disclosure and description of the invention is illustrative and explanatory thereof and various changes in the size, shape and materials used, as well as in the details of the procedure and method and particular order of steps may be made within the scope of the appended claims without departing from the spirit of the invention.

What is claimed is:

1. A method of cementing wells under relatively cold climatic conditions, comprising the steps of:
    (a) introducing a hydraulic cement slurry into a desired position in a well bore for cementing a well casing therein;
    (b) placing a cementing plug on top of the cement slurry;
    (c) placing a mixture of sodium hydroxide, water and sodium nitrate into the well bore behind the top plug in an amount sufficient to cover an area to be heated; and
    (d) introducing a quantity of aluminum into the mixture of sodium hydroxide, water and sodium nitrate and capable of reacting therewith whereby a sufficient amount of heat is produced to warm the casing thereby warming the cement slurry and accelerating the set thereof.

2. The method of claim 2, wherein the ratio based on pounds per gallon of water of sodium hydroxide, sodium nitrate and aluminum ranges from about 0.5:0.5:0.1, respectively, to about 1:1:0.1, respectively.

3. The method of claim 1, wherein the ratio based on pounds per gallon of water of sodium hydroxide, sodium nitrate and aluminum is about 1:1:0.1, respectively.

4. A method of cementing wells under relatively cold climatic conditions, comprising the steps of:
    (a) introducing a hydraulic cement slurry into a desired area in a well bore for cementing a casing therein;
    (b) placing a cementing plug on top of the cement slurry;
    (c) mixing predetermined amounts of caustic soda and water in a jet mixer;
    (d) recirculating the caustic soda and water mixture through the jet mixer and adding a predetermined amount of sodium nitrate;
    (e) introducing a quantity of the solution obtained above into the well bore for heating a predetermined portion of the well casing; and, (f) adding a predetermined amount of aluminum from the well head to the solution thereby generating a quantity of heat whereby the casing is heated and thereby heating the cement slurry to accelerate the set thereof.

5. The method as set forth in claim 4, wherein the aluminum added is fashioned into a bomb and suspended from a wireline thereby enabling the aluminum to be placed in the solution and removed therefrom as desired.

References Cited by the Examiner
UNITED STATES PATENTS

| | | | |
|---|---|---|---|
| 2,824,611 | 2/58 | Burch | 166—38 |
| 2,941,595 | 6/60 | Emery | 166—38 |
| 2,941,596 | 6/60 | Kaasa | 166—38 |
| 3,103,973 | 9/63 | Mullen | 166—25 |

BENJAMIN HERSH, *Primary Examiner.*
CHARLES E. O'CONNELL, *Examiner.*